United States Patent
Yu et al.

(10) Patent No.: US 11,828,327 B2
(45) Date of Patent: Nov. 28, 2023

(54) ELECTRIC-MACHINE SHAFT

(71) Applicant: Jing-Jin Electric Technologies Co., Ltd., Beijing (CN)

(72) Inventors: Ping Yu, Beijing (CN); Zhenjun Zhang, Beijing (CN); Zhe Feng, Beijing (CN); Kunxing Sun, Beijing (CN); Li Liu, Beijing (CN)

(73) Assignee: JING-JIN ELECTRIC TECHNOLOGIES CO., LTD.

( * ) Notice: Subject to any disclaimer, the term of this patent is extended or adjusted under 35 U.S.C. 154(b) by 556 days.

(21) Appl. No.: 17/089,276

(22) Filed: Nov. 4, 2020

(65) Prior Publication Data

US 2022/0069671 A1   Mar. 3, 2022

(30) Foreign Application Priority Data

Aug. 31, 2020   (CN) .......................... 202010896374.1

(51) Int. Cl.
  *F16C 3/02*   (2006.01)
  *H02K 7/00*   (2006.01)
  *H02K 9/19*   (2006.01)

(52) U.S. Cl.
  CPC .............. *F16C 3/02* (2013.01); *H02K 7/003* (2013.01); *H02K 9/19* (2013.01); *F16C 2380/26* (2013.01)

(58) Field of Classification Search
  CPC ....... F16C 3/02; F16C 2380/26; H02K 7/003; H02K 9/19; H02K 1/32; H02K 9/193
  See application file for complete search history.

(56) References Cited

U.S. PATENT DOCUMENTS 6,191,511 B1    2/2001  Zysset
10,587,169 B2 *  3/2020  Gruetzner ................ H02K 1/32
                       (Continued)

FOREIGN PATENT DOCUMENTS

CN         111555500 A       8/2020
DE    10 2008 001 607 A1    11/2009
                       (Continued)

OTHER PUBLICATIONS

European Search Report dated Apr. 22, 2021.

*Primary Examiner* — Jacob M Amick
*Assistant Examiner* — Charles J Brauch
(74) *Attorney, Agent, or Firm* — Clark Hill PLC; James R. Foley

(57) ABSTRACT

The present disclosure discloses an electric-machine shaft, wherein the electric-machine shaft is provided with a hollow structure in an axial direction at least one end, and the hollow structure is, at a position close to the end, provided with a coolant pumping mechanism having a spiral groove, so that the coolant is able to enter the hollow structure by an attractive force generated by rotation of the electric-machine shaft; the spiral groove is provided on an inner surface of an annular member, the annular member is fixedly mounted to the hollow structure, or the spiral groove is directly provided on an inner surface of the hollow structure; and the electric-machine shaft is provided with a plurality of groups of coolant channels in an axial direction, the coolant channels are in communication with the hollow structure, and when the electric-machine shaft is rotating, oil liquid inside the hollow structure is thrown out by the coolant channels, to cool components inside an electric-machine housing. In the present disclosure, by providing the hollow structure and the coolant pumping mechanism, a structure similar to a pump is formed, and when the electric-machine shaft is rotating, the coolant can be attracted into the hollow structure, and (Continued)

then be thrown out by the coolant channels, which realizes the cooling and lubrication of the components inside the electric-machine housing, and improves the capacity of heat dissipation of the electric machine.

17 Claims, 2 Drawing Sheets

(56) References Cited

U.S. PATENT DOCUMENTS

| | | |
|---|---|---|
| 2010/0320850 A1 | 12/2010 | Lemmers, Jr. et al. |
| 2011/0169353 A1 | 7/2011 | Endo |
| 2013/0038151 A1 | 2/2013 | Ohashi et al. |

FOREIGN PATENT DOCUMENTS

| | | |
|---|---|---|
| DE | 10 2012 022453 A1 | 5/2014 |
| JP | H08-1616 U | 11/1996 |
| JP | 2000-102216 A | 4/2000 |
| JP | 2001-197705 A | 7/2001 |
| JP | 2004-096865 A | 3/2004 |
| JP | 2010-104206 A | 5/2010 |
| WO | 2011/132784 A1 | 10/2011 |

\* cited by examiner

ELECTRIC-MACHINE SHAFT

TECHNICAL FIELD

The present disclosure relates to the technical field of electric-machine manufacturing, and particularly relates to an electric-machine shaft.

BACKGROUND

Along with the development of the automobile industry, the duration performance of the electric motors of new-energy vehicles has become an important technical index for quality evaluation of modern car manufacturing. The duration performance of an electric motor is mainly related to the loss and heat generation and the capacity of cooling and heat dissipation of the electric motor itself, and the loss and heat generation of an electric motor itself is related to the hardware design of the electric motor. How to optimize the cooling structure, to effectively improve the capacity of heat dissipation of electric motors, thereby improving the duration performance of the electric motors and even the vehicles, is one of the issues that gain the attention of large manufacturing enterprises of entire cars and component parts in the global car industry.

The major factors that influence the continuous power and the duration performance of an electric motor are the electromagnetic design and the structure design, such as the copper loss, the iron loss and the mechanical loss. As for the electric motors of new-energy vehicles, the key to improve the duration performance is how to reduce the losses or improve the capacity of heat dissipation. Because the losses are restricted by the required target performance, and the margin for the reduction of the losses from the hardware itself is limited, the optimization of the cooling structure has become a solution of a high efficiency and a low cost.

SUMMARY

Aiming at the above problems, the present disclosure discloses an electric-machine shaft, to overcome the above problems or at least partially solve the above problems.

In order to achieve the above objects, the present disclosure employs the following technical solutions:

The present disclosure discloses an electric-machine shaft, wherein the electric-machine shaft is provided with a hollow structure in an axial direction at least one end, and the hollow structure is, at a position close to the end, provided with a coolant pumping mechanism having a spiral groove, so that the coolant is able to enter the hollow structure by an attractive force generated by rotation of the electric-machine shaft;

the spiral groove is provided on an inner surface of an annular member, the annular member is fixedly mounted to the hollow structure, or the spiral groove is directly provided on an inner surface of the hollow structure; and the electric-machine shaft is provided with a plurality of groups of coolant channels in an axial direction, the coolant channels are in communication with the hollow structure, and when the electric-machine shaft is rotating, oil liquid inside the hollow structure is thrown out by the coolant channels, to cool components inside an electric-machine housing.

Optionally, the coolant pumping mechanism further comprises a mandrel, the mandrel is provided inside the spiral groove, and the spiral groove and the mandrel are rotatable relative to each other.

Optionally, the mandrel and a hollow tube provided at the end are fixedly connected or are integrated, the hollow tube is in communication with an exterior of the electric-machine shaft, and a tube wall of the hollow tube is provided with a plurality of radial holes at a position close to the spiral groove.

Optionally, the hollow tube is a horn-shaped tube, the mandrel is fixed at an interior of a side of the horn-shaped tube that is further away from the end, and the mandrel extends at the radial holes toward a horn mouth of the horn-shaped tube, to increase the attractive force of the coolant pumping mechanism.

Optionally, the hollow tube is engaged with an external coolant pipe, or the hollow tube extends out of the electric-machine shaft, to receive the coolant from the internal of the electric-machine housing.

Optionally, the hollow tube is fixed to an electric-machine-housing assembly.

Optionally, a clearance distance between the mandrel and the spiral groove in the radial direction is regulatable.

Optionally, the coolant pumping mechanism is provided at one end or two ends of the electric-machine shaft, and the coolant pumping mechanisms at the two ends are the same or different.

Optionally, the coolant channels are inclined relative to or are perpendicular to an axis of the electric-machine shaft, to cool or lubricate one or more of an electric-machine bearing, a stator winding and a rotor.

Optionally, each of the groups of coolant channels includes a plurality of coolant channels that are evenly distributed on the electric-machine shaft; and/or, an annular groove is provided on an outer side of the spiral groove proximal to the end, and the coolant enters the spiral groove via the annular groove.

The advantages and advantageous effects of the present disclosure are as follows.

In the present disclosure, by providing the hollow structure inside the electric-machine shaft and providing the coolant pumping mechanism inside the hollow structure, a structure similar to a pump is formed, and when the electric-machine shaft is rotating, the coolant can enter the hollow structure by the attractive force generated by the rotation of the electric-machine shaft, and then be thrown out via the coolant channels, which realizes the cooling and lubrication of the components inside the electric-machine housing, effectively improves the capacity of heat dissipation of the electric machine, and improves the duration performance of the electric machine. Furthermore, the electric-machine shaft according to the present disclosure has a simple structure and is easy to manufacture.

BRIEF DESCRIPTION OF THE DRAWINGS

By reading the following detailed description of the preferable embodiments, various other advantages and benefits will become clear to a person skilled in the art. The drawings are merely intended to show the preferable embodiments, and are not to be considered as limiting the present disclosure. Furthermore, throughout the drawings, the same reference signs denote the same elements. In the drawings.

Figure 1:
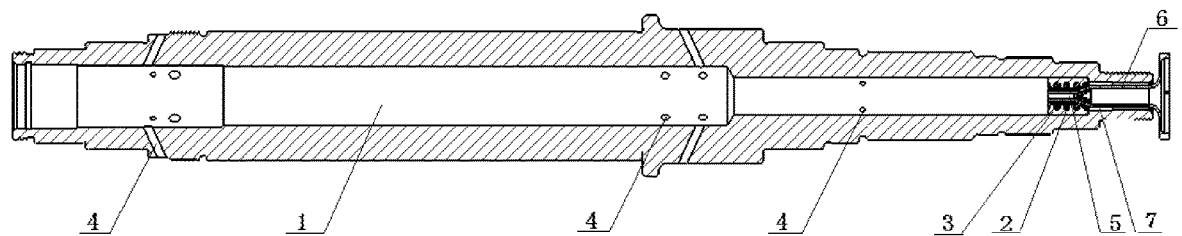
FIG. 1 is an axial sectional view of the electric-machine shaft according to an embodiment of the present disclosure.

In the drawings: 1. hollow structure, 2. spiral groove, 3. annular member, 4. coolant channels, 5. mandrel, 6. hollow tube, and 7. annular groove.

DETAILED DESCRIPTION

In order to make the objects, the technical solutions and the advantages of the present disclosure clearer, the technical solutions of the present disclosure will be clearly and completely described below with reference to the particular embodiments and the corresponding drawings of the present disclosure. Apparently, the described embodiments are merely certain embodiments of the present disclosure, rather than all of the embodiments. All of the other embodiments that a person skilled in the art obtains on the basis of the embodiments in the present disclosure without paying creative work fall within the protection scope of the present disclosure.

The technical solutions provided by the embodiments of the present disclosure will be described in detail below with reference to the drawings.

Figure 2:
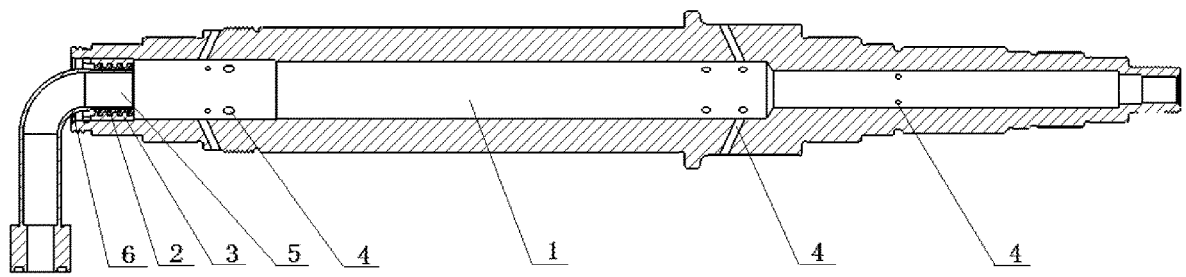
FIG. 2 is an axial sectional view of the electric-machine shaft according to an embodiment of the present disclosure.
Figure 3:
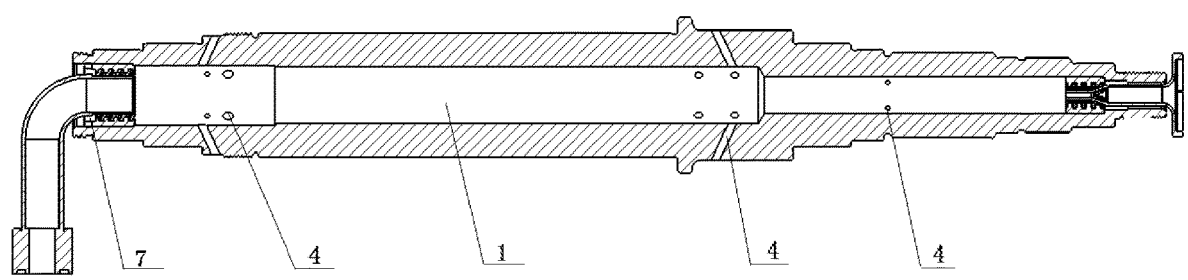
FIG. 3 is an axial sectional view of the electric-machine shaft according to an embodiment of the present disclosure.

An embodiment of the present disclosure discloses an electric-machine shaft. As shown in FIGS. 1-3, the electric-machine shaft is provided with a hollow structure 1 in the axial direction at at least one end. When the hollow structure 1 is provided at one end in the axial direction, the other end is of a solid structure or a closed structure. When both of the two ends are provided with the hollow structure 1, the hollow structure 1 extends throughout the electric-machine shaft in the axial direction. The hollow structure 1 is, at a position close to the end, provided with a coolant pumping mechanism having a spiral groove 2. The coolant pumping mechanism is similar to the structure of a water pump. When the electric-machine shaft is rotating, the coolant pumping mechanism enables the coolant to enter the hollow structure 1 by the attractive force generated by the rotation of the electric-machine shaft. When both of the two ends are provided with the hollow structure 1, the coolant pumping mechanism may be provided in the hollow structures 1 at the two ends of the electric-machine shaft or be merely provided in the hollow structure 1 at one end of the electric-machine shaft.

The spiral groove 2 is provided on the inner surface of an annular member 3. The annular member 3 is fixedly mounted to the hollow structure 1. The spiral groove 2 is obtained by processing the annular member 3, and then the annular member 3 is mounted inside the hollow structure 1. Alternatively, the spiral groove 2 is directly provided on the inner surface of the hollow structure 1, wherein when the electric-machine shaft is being manufactured, the spiral groove 2 is directly processed on the inner surface of the hollow structure 1. The length of the spiral groove 2 may be set according to the demands.

The electric-machine shaft is provided with a plurality of groups of coolant channels 4 in the axial direction, the coolant channels 4 are in communication with the hollow structure 1, and when the electric-machine shaft is rotating, the coolant channels 4 threw out the oil liquid inside the hollow structure 1, to cool and lubricate the components inside the electric-machine housing.

In conclusion, in the present embodiment, by providing the hollow structure 1 inside the electric-machine shaft and providing the coolant pumping mechanism inside the hollow structure 1, a structure similar to a pump is formed, and when the electric-machine shaft is rotating, the coolant can enter the hollow structure 1 by the attractive force generated by the rotation of the electric-machine shaft, and then be thrown out via the coolant channels 4, which realizes the cooling and lubrication of the components inside the electric-machine housing, effectively improves the capacity of heat dissipation of the electric machine, and improves the duration performance of the electric machine. Furthermore, the electric-machine shaft according to the present disclosure has a simple structure and is easy to manufacture.

Figure 4:
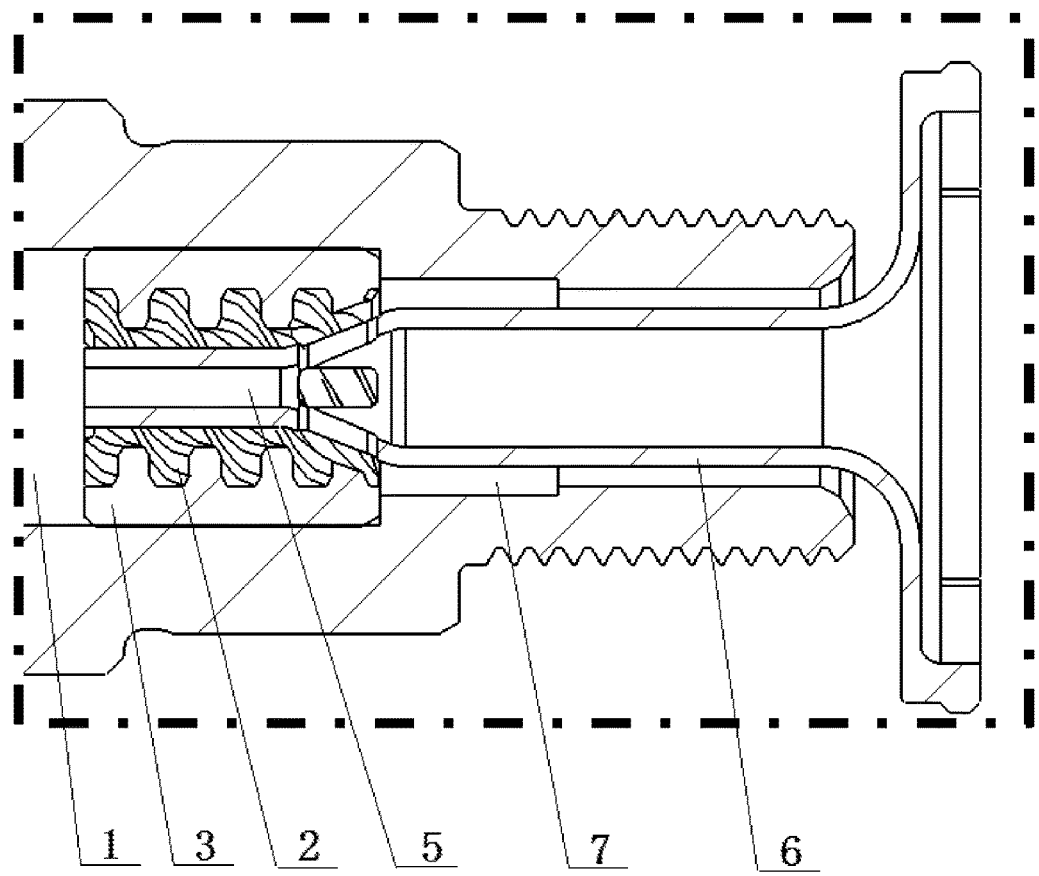
FIG. 4 is a positional and structural diagram of the coolant pumping mechanism according to an embodiment of the present disclosure.

In an embodiment, as shown in FIG. 4, the coolant pumping mechanism further comprises a mandrel 5. The mandrel 5 is provided inside the spiral groove 2, and is located at the inner diameter of the spiral groove 2. When the electric-machine shaft is rotating, the spiral groove 2 and the mandrel 5 are rotatable relative to each other. The spiral groove 2 and the mandrel 5 form a structure similar to a pump, which, when they are rotating relatively to each other, can suck the liquid from one end into the other end, i.e., sucking the oil liquid into the hollow structure 1, and in turn enable more oil liquid to enter the hollow structure 1, and simultaneously increase the pressure of the oil liquid inside the hollow structure 1, to eject the oil liquid out of the coolant channels 4.

In an embodiment, the mandrel 5 and a hollow tube 6 provided at the end are fixedly connected or are integrated, the hollow tube 6 is in communication with an exterior of the electric-machine shaft, and the hollow tube 6 and the hollow structure 1 are in clearance fit. It can be seen from FIGS. 1-3 that one end of the hollow tube 6 is fixedly connected to the mandrel 5, the other end is in communication with the exterior of the electric-machine shaft, the tube wall of the hollow tube 6 is provided with a plurality of radial holes at positions close to the spiral groove 2, and the oil liquid inside the hollow tube 6 enters the spiral groove 2 via the radial holes.

In a preferable embodiment, as shown in FIG. 1, the hollow tube 6 is a horn-shaped tube. The configuration of the horn-shaped tube facilitates the collection of the oil liquid, and in turn enables more oil liquid to enter the hollow structure 1. The mandrel 5 is fixed at the interior of the side of the horn-shaped tube that is further away from the end. It can be seen from FIG. 4 that the mandrel 5 extends at the radial holes toward the horn mouth of the horn-shaped tube, to increase the attractive force of the coolant pumping mechanism.

In an embodiment, the hollow tube 6 may be engaged with an external coolant pipe, and the coolant inside the coolant pipe directly enters the hollow tube 6. The hollow tube 6 may also extend out of the electric-machine shaft, to receive the coolant from the internal of the electric-machine housing. The coolant inside the electric-machine housing may enter the hollow tube 6 by splashing, ejection or other modes. Because the hollow tube 6 and the electric-machine shaft are in clearance fit, the coolant inside the electric-machine housing may also be directly attracted into the hollow structure 1 inside the electric-machine shaft via the clearance.

In an embodiment, the hollow tube 6 is fixed to an electric-machine-housing assembly. Such a design can enable the hollow tube 6 to be relatively static when the electric-machine shaft is rotating. Because the hollow tube 6 and the mandrel 5 are fixedly connected, the mandrel 5 can maintain static when the electric-machine shaft is rotating, to realize the relative movement between the mandrel 5 and the spiral groove 2.

In an embodiment, the clearance distance between the mandrel 5 and the spiral groove 2 in the radial direction is regulatable. The diameter of the mandrel 5 and the diameter of the spiral groove 2 may be regulated according to the demands, to in turn realize the regulation of the radial distance between the mandrel 5 and the spiral groove 2.

In an embodiment, as shown in FIGS. 1-3, when both of the two ends of the electric-machine shaft are provided with the hollow structure 1, the coolant pumping mechanism is provided at one end or two ends of the electric-machine shaft, which may be configured according to the demands. The coolant pumping mechanisms at the two ends are the same or different, and the coolant pumping mechanisms at the two ends may be different in terms of the sizes, the positions or the shapes.

Figure 5:
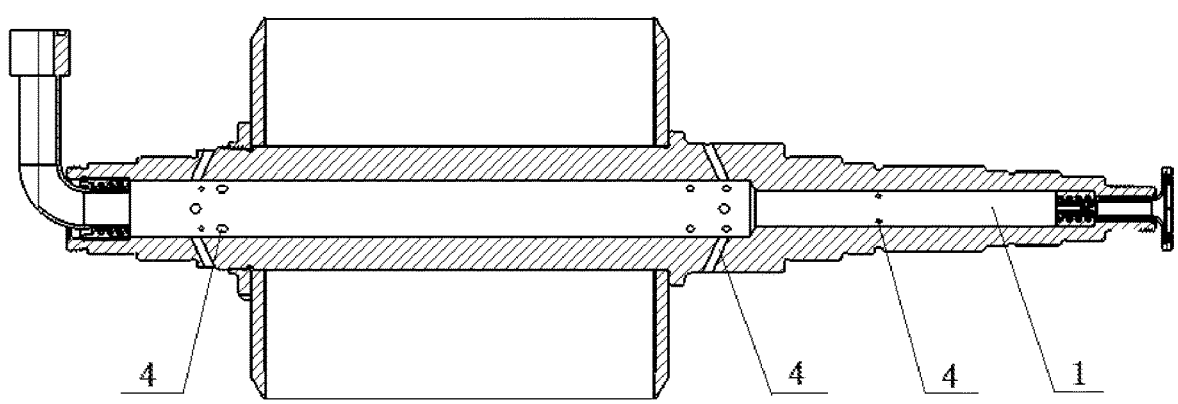
FIG. 5 is an axial sectional view of the electric-machine shaft mounted with a rotor according to an embodiment of the present disclosure.

In an embodiment, as shown in FIG. 5, the coolant channels 4 may be inclined relative to or be perpendicular to the axis of the electric-machine shaft according to the demands, to cool or lubricate one or more of an electric-machine bearing, a stator winding and a rotor. When the electric-machine bearing is to be cooled and lubricated, the coolant channels 4 are provided at the position of the bearing, and when the electric-machine shaft is rotating, the oil liquid passes through the coolant channels 4 there to be thrown to the electric-machine bearing. When the stator winding is to be cooled, the coolant channels 4 are provided at the position of the stator winding, and when the electric-machine shaft is rotating, the oil liquid passes through the coolant channels 4 there to be thrown to the stator winding. When the rotor is to be cooled, the coolant channels 4 are provided at the positions of the two ends of the rotor, and are inclined toward the rotor, and when the electric-machine shaft is rotating, the oil liquid passes through the coolant channels 4 there to be thrown to the rotor.

In an embodiment, each of the groups of coolant channels 4 includes a plurality of coolant channels that are provided on the electric-machine shaft.

As shown in FIG. 4, an annular groove 7 is provided on the inner wall of the hollow structure 1 outside the spiral groove 2 close to the shaft end, the spiral groove 2 and the annular groove 7 are in communication, and the radial holes are provided at the hollow tube 6 at the annular groove 7. The coolant in the hollow tube 6 enters the annular groove 7 via the radial holes, and then the coolant enters the spiral groove 2 via the annular groove 7.

In conclusion, the present disclosure discloses an electric-machine shaft, wherein the electric-machine shaft is provided with a hollow structure in an axial direction at at least one end, and the hollow structure is, at a position close to the end, provided with a coolant pumping mechanism having a spiral groove, so that the coolant is able to enter the hollow structure by an attractive force generated by rotation of the electric-machine shaft; the spiral groove is provided on an inner surface of an annular member, the annular member is fixedly mounted to the hollow structure, or the spiral groove is directly provided on an inner surface of the hollow structure; and the electric-machine shaft is provided with a plurality of groups of coolant channels in an axial direction, the coolant channels are in communication with the hollow structure, and when the electric-machine shaft is rotating, oil liquid inside the hollow structure is thrown out by the coolant channels, to cool components inside an electric-machine housing. In the present disclosure, by providing the hollow structure and the coolant pumping mechanism, a structure similar to a pump is formed, and when the electric-machine shaft is rotating, the coolant can be attracted into the hollow structure, and then be thrown out by the coolant channels, which realizes the cooling and lubrication of the components inside the electric-machine housing, and improves the capacity of heat dissipation of the electric machine.

The above are merely embodiments of the present disclosure, and are not limiting the protection scope of the present disclosure. Any modifications, equivalent substitutions, improvements and extensions that are made within the spirit and principle of the present disclosure should fall within the protection scope of the present disclosure.

What is claimed is:

1. An electric-machine shaft, wherein the electric-machine shaft is provided with a hollow structure in an axial direction at least one end, and the hollow structure is, at a position close to the end, provided with a coolant pump having a spiral groove and a mandrel, so that the coolant is able to enter the hollow structure by an attractive force generated by rotation of the electric-machine shaft;
the spiral groove is provided on an inner surface of an annular member, the annular member is fixedly mounted to the hollow structure, or the spiral groove is directly provided on an inner surface of the hollow structure; and
the electric-machine shaft is provided with a plurality of groups of coolant channels in an axial direction, the coolant channels are in communication with the hollow structure, and when the electric-machine shaft is rotating, oil liquid inside the hollow structure is thrown out by the coolant channels, to cool components inside an electric-machine housing, the mandrel is provided inside the spiral groove, and the spiral groove and the mandrel are rotatable relative to each other.

2. The electric-machine shaft according to claim 1, wherein the mandrel and a hollow tube provided at the end are fixedly connected or are integrated, the hollow tube is in communication with an exterior of the electric-machine shaft, and a tube wall of the hollow tube is provided with a plurality of radial holes at a position close to the spiral groove.

3. The electric-machine shaft according to claim 2, wherein the hollow tube is a horn-shaped tube, the mandrel is fixed at an interior of a side of the horn-shaped tube that is further away from the end, and the mandrel extends at the radial holes toward a horn mouth of the horn-shaped tube, to increase the attractive force of the coolant pump.

4. The electric-machine shaft according to claim 2, wherein the hollow tube is engaged with an external coolant pipe, or the hollow tube extends out of the electric-machine shaft, to receive the coolant from the internal of the electric-machine housing.

5. The electric-machine shaft according to claim 2, wherein the hollow tube is fixed to an electric-machine-housing assembly.

6. The electric-machine shaft according to claim 1, wherein a clearance distance between the mandrel and the spiral groove in the radial direction is regulatable.

7. The electric-machine shaft according to claim 1, wherein the coolant pump is provided at one end or two ends of the electric-machine shaft, and the coolant pump at the two ends are the same or different.

8. The electric-machine shaft according to claim 1, wherein the coolant channels are inclined relative to or are perpendicular to an axis of the electric-machine shaft, to cool or lubricate one or more of an electric-machine bearing, a stator winding and a rotor.

9. The electric-machine shaft according to claim 1, wherein each of the groups of coolant channels includes a plurality of coolant channels that are evenly distributed on the electric-machine shaft; and/or, an annular groove is provided on an outer side of the spiral groove proximal to the end, and the coolant enters the spiral groove via the annular groove.

10. The electric-machine shaft according to claim 3, wherein the hollow tube is fixed to an electric-machine-housing assembly.

11. The electric-machine shaft according to claim 4, wherein the hollow tube is fixed to an electric-machine-housing assembly.

12. The electric-machine shaft according to claim 2, wherein a clearance distance between the mandrel and the spiral groove in the radial direction is regulatable.

13. The electric-machine shaft according to claim 3, wherein a clearance distance between the mandrel and the spiral groove in the radial direction is regulatable.

14. The electric-machine shaft according to claim 4, wherein a clearance distance between the mandrel and the spiral groove in the radial direction is regulatable.

15. The electric-machine shaft according to claim 2, wherein the coolant pump is provided at one end or two ends of the electric-machine shaft, and the coolant pump at the two ends are the same or different.

16. The electric-machine shaft according to claim 2, wherein the coolant channels are inclined relative to or are perpendicular to an axis of the electric-machine shaft, to cool or lubricate one or more of an electric-machine bearing, a stator winding and a rotor.

17. The electric-machine shaft according to claim 2, wherein each of the groups of coolant channels includes a plurality of coolant channels that are evenly distributed on the electric-machine shaft; and/or, an annular groove is provided on an outer side of the spiral groove proximal to the end, and the coolant enters the spiral groove via the annular groove.

* * * * *